3,004,820
Patented Oct. 17, 1961

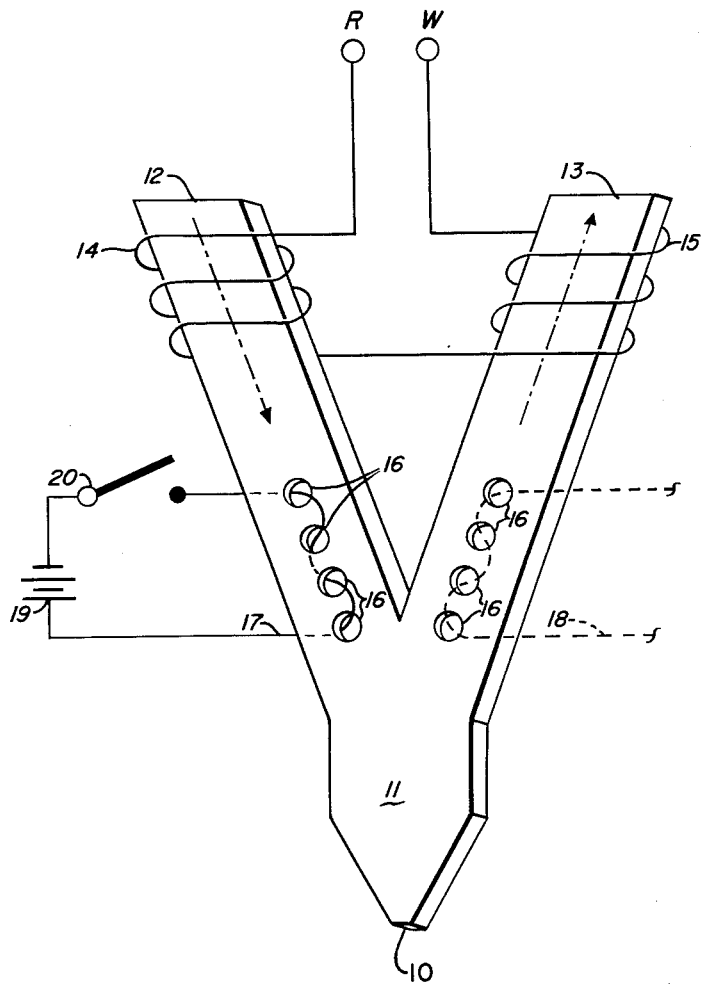

---

3,004,820
MAGNETIC BALANCED WINDING TRANSDUCER
William E. Howden, Berkeley, Calif., assignor to International Business Machines Corporation, New York, N.Y., a corporation of New York
Filed Oct. 7, 1957, Ser. No. 688,558
7 Claims. (Cl. 346—74)

This invention relates to magnetic recording devices and more particularly to magnetic transducers wherein the flux path is controlled by a gate incorporated into the core structure of the transducer.

Magnetic transducers of the type described and claimed in this application have been shown in copending application Serial No. 601,200 filed July 31, 1956. The present invention is directed to a modification of the generic type of gated magnetic transducer wherein the transducer winding is composed of a pair of balanced coils connected in series so that their magnetic fields are opposing when the coils are energized for recording, or so that their combined flux is zero when the transducer is subjected to a signal in the absence of a gating control affecting one or the other of the coils. The particular arrangement shown is simple to manufacture and provides a relatively short flux path, resulting in a more efficient magnetic transducer. Another advantage of the present invention is that the noise level during recording is reduced to a minimum as a result of the adjacent poles near the active tip of the transducer core being at opposite magnetic polarities.

It is an object of the present invention to provide an improved magnetic transducer having internal magnetic gating.

Another object of the invention is to provide a gated magnetic transducer for the reduction of noise during recording, thereby reducing the background level.

A still further object is to provide a gated magnetic transducer having balanced signal windings and unbalanced gating windings.

Other objects of the invention will be pointed out in the following description and claims and illustrated in the accompanying drawing which discloses, by way of example, the principle of the invention and the best mode which has been contemplated of applying that principle.

With reference to the drawing, a Y-shaped transducer core 11 having an active tip 10 is provided with a pair of windings 14 and 15, respectively wound about the arms 12 and 13 of the transducer core. Windings 14 and 15 are connected in series and are so wound that when potential is applied to their common terminals R and W, the flux produced in winding 14 cancels the flux produced in winding 15 insofar as the active tip 10 is concerned. Similarly, when the active tip of the transducer is placed near a magnetic record, the flux induced into each of the windings 14 and 15 induces potentials which effectively cancel each other so that the net potential across the terminals R and W is zero. In each of the arms of the transducer core 11 are a series of holes 16. These holes are located between the active tip of the transducer and the respective windings 14 and 15 of the arms 12 and 13. Through the holes in the arm 12 there is threaded a winding 17 and through the holes in the arm 13 there is threaded a winding 18 (dotted line). The windings 17 and 18 are used for providing the magnetic flux gate which controls the transducer in both recording and reading through the coaction of the active tip 10 with a moving magnetic record.

The winding 17 which passes through the holes 16 in the arm 12 is connected to a direct current source, such as a battery 19, which can be applied to the winding 17 by closing a switch 20 as shown in the drawing. A similar arrangement can be provided for the winding 18 which is wound through the holes 16 in the arm 13; however, only one winding is necessary for providing suitable gatings of the transducer in both reading and writing operations. When it is desired to write upon a magnetic record with the transducer, the signal is applied to the terminals R and W of the balanced windings 14 and 15. As explained previously, the flux which is set up in each of the arms 12 and 13 acts to cancel so that the tip 10 receives no recording flux. However, when the switch 20 is closed, that portion of the arm 12 through which the winding 17 is threaded via the holes 16 is saturated or partially saturated so that the flux produced by winding 14 is no longer enabled to cancel all of the flux provided by the winding 15; consequently, recording flux provided by coil 15 is effective to record upon a moving record coacting with the tip 10 of the transducer 11. Similarly, when the transducer 11 is used for reading data from a moving magnetic record coacting with the tip 10 of the transducer 11, if switch 20 is closed, the flux which normally would induce potential in the winding 14 is blocked off so that less potential is induced in the winding 14 than in the winding 15 (which does not have any of its flux cut off), thereby providing a signal output at the terminals R and W.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A magnetic transducer having means for creating two parallel magnetic circuits joined in a common terminus for coacting with a magnetic recording surface, means for generating flux of equal magnitude in each of said parallel circuits the flux in one of said circuits opposing the flux in the other of said circuits whereby the resultant flux at said terminus is substantially zero in magnitude, and means for blocking one of said parallel circuits to provide an imbalance of flux at said terminus.

2. A magnetic transducer having means for creating two parallel magnetic circuits joined in a common terminus for coacting with a magnetic recording surface, means for generating flux of equal magnitude in each of said parallel circuits, the algebraic sum of the flux at said terminus being equal to zero, and means for cancelling the effective flux of one of said parallel circuits with respect to said terminus.

3. A magnetic transducer including a pair of magnetically parallel core members, an end of one member being joined with an end of the other member, the resulting junction being adapted to coact with a magnetic recording surface, a winding for each said parallel member, means for energizing said windings to produce magnetic flux of opposing polarities in said parallel members effectively cancelling all flux at said junction, and means for saturating one of said parallel members to effectively block its flux whereby the flux of the other said member is manifested at said junction.

4. A magnetic transducer including a pair of magnetically parallel core members, an end of one member being joined with an end of the other member, the resulting junction being adapted to coact with a magnetic recording surface, a winding for each said parallel member, means for energizing said windings to produce magnetic flux of opposing polarities in said parallel members effectively cancelling all flux at said junction, and means for saturating a section of one of said parallel members to effectively block its flux whereby the flux of the other said member is manifested at said junction.

5. A magnetic transducer including a pair of magnetically parallel core members, an end of one member being joined with an end of the other member, the resulting junction being adapted to coact with a magnetic recording surface, a winding for each said parallel member, means for energizing said windings to produce magnetic flux of opposing polarities in said parallel members effectively cancelling all flux at said junction, a second winding on one of said parallel members arranged between said junction and the first said winding for generating quadrature flux to saturate a section of said member whereby the flux of the other said member predominates at said junction, and means to energize said second winding.

6. A magnetic transducer for coacting with a magnetic record comprising a pair of magnetically parallel core members joined together at their ends, the resulting junction coacting with said record whereby flux is induced in each said member, a winding for each member, said windings being series connected so that the algebraic sum of the induced voltages from the said induced flux is zero, and means for blocking the flux induced in one said parallel member whereby the resultant voltage of the said series windings is finite.

7. The invention of claim 6 wherein the said blocking means is a second winding interposed upon one of said members for generating quadrature magnetic flux.

References Cited in the file of this patent

UNITED STATES PATENTS

| | | |
|---|---|---|
| 2,536,260 | Burns | Jan. 2, 1951 |
| 2,608,621 | Peterson | Aug. 26, 1952 |
| 2,722,569 | Loper | Nov. 1, 1955 |
| 2,804,506 | Schurch | Aug. 27, 1957 |
| 2,830,130 | Greenwood | Apr. 8, 1958 |
| 2,870,267 | Duinker et al. | Jan. 20, 1959 |

FOREIGN PATENTS

| | | |
|---|---|---|
| 737,497 | Great Britain | Sept. 28, 1955 |
| 881,089 | Germany | June 25, 1953 |